(12) United States Patent
Yusuf

(10) Patent No.: US 12,118,804 B2
(45) Date of Patent: Oct. 15, 2024

(54) GPU BASED EMBEDDED VISION SOLUTION

(71) Applicant: SEEKRIGHT LIMITED, Al Maryah Island (AE)

(72) Inventor: Mohamed Salman Yusuf, Chennai (IN)

(73) Assignee: SEEKRIGHT LIMITED, Al Maryah Island (AE)

( * ) Notice: Subject to any disclaimer, the term of this patent is extended or adjusted under 35 U.S.C. 154(b) by 316 days.

(21) Appl. No.: 17/578,911

(22) Filed: Jan. 19, 2022

(65) Prior Publication Data

US 2023/0118819 A1 Apr. 20, 2023

(30) Foreign Application Priority Data

Oct. 14, 2021 (IN) .............................. 202141046980

(51) Int. Cl.
*G06V 20/56* (2022.01)
*G06T 11/20* (2006.01)
*G06V 20/58* (2022.01)

(52) U.S. Cl.
CPC ............ *G06V 20/588* (2022.01); *G06T 11/20* (2013.01); *G06V 20/58* (2022.01); *G06T 2210/12* (2013.01)

(58) Field of Classification Search
CPC ...... G06V 20/588; G06V 20/58; G06V 20/56; G06V 20/54; G06V 20/182; G06V 20/64; G06V 20/44; G06V 20/46; G06V 20/52; G06V 20/582; G06V 20/584; G06V 20/63; G06V 40/1365; G06V 40/1347; G06V 10/225; G06V 10/255; G06V 20/49; G06V 10/82; G06V 40/172; G06V 10/764; G06V 2201/08; G06V 40/168; G06V 40/20; G06V 10/7553; G06V 10/761; G06V 10/806; G06V 20/40; G06T 11/20; G06T 2210/12; G06T 2207/30252; G06T 2207/10048; G06T 2207/30232; G06T 2207/10016; G06T 7/337; G06T 7/00; G06T 11/00; G06T 2207/20081; G06T 7/0004; G06T 7/001; G06T 1/00; G06T 15/205; G06T 17/00; G06T 2207/10024; G06T 2207/10004; G06T 2207/20084; G06T 2207/30108; G06T 2207/30256; G06T 2207/30261; G06T 7/75; G06T 7/246;

(Continued)

(56) References Cited

U.S. PATENT DOCUMENTS

2009/0278938 A1* 11/2009 Shulman ................ G01C 11/02
348/169
2016/0180144 A1* 6/2016 Tatourian ............... G06V 20/13
382/104

(Continued)

*Primary Examiner* — Nimesh Patel
(74) *Attorney, Agent, or Firm* — Spencer Fane LLP

(57) ABSTRACT

The present invention relates to system and method that detects objects and assigns trackers to each object and maps it to detections to its corresponding Geo-Coordinates. Based on the number of detections, it assigns new trackers and counts the objects identified using optimal and efficient computation. The present system requires just one detection and its location to create a tracker accurately. Also, if an object is missing in any given location, the present system identifies the Geo-Coordinates and shows the image along with its details.

16 Claims, 4 Drawing Sheets

(58) Field of Classification Search
CPC . G06T 7/215; G06T 7/20; G06T 2207/30236; G06T 2207/10028; G06T 2207/30241; G06T 5/50; G06T 7/60; G06T 7/70; G06T 7/74; G08G 1/0112; G08G 1/0141; G08G 1/0129; G08G 1/095; G08G 1/0116; G08G 1/167; G08G 1/0175; G08G 1/0104; G08G 1/04; G08G 1/00; G08G 1/0125; G08G 1/162; G08G 1/163; G08G 5/04; G08G 9/02; G08G 1/01; G08G 1/012; B60R 2001/1253; B60R 2300/105; B60R 2300/202; B60R 2300/205; B60R 2300/301; B60R 2300/303; B60R 2300/60; B60R 2300/80; B60R 2300/8086; B60R 2300/8093; B60R 2300/8026; B60R 1/081; B60R 1/00; B60R 25/305; B64U 2101/30; B64U 2201/10

See application file for complete search history.

(56) References Cited

U.S. PATENT DOCUMENTS

| | | | |
|---|---|---|---|
| 2018/0075303 A1* | 3/2018 | Edmondson | G06V 20/41 |
| 2020/0211376 A1* | 7/2020 | Roka | G01C 21/3492 |
| 2024/0010226 A1* | 1/2024 | Hemantharaja | G06F 21/64 |

* cited by examiner

GPU BASED EMBEDDED VISION SOLUTION

FIELD OF INVENTION

The present invention is directed to a GPU based embedded vision solution, and more particularly to a GPU based embedded vision solution for highways assets management for roadways which detects, tracks and monitors the assets.

BACKGROUND OF INVENTION

Computer Vision, a sub branch of Machine Learning has experienced a revolution in working with imagery data for the task of object classification and detection. The existing object detection choices include convolutional neural networks (CNN's), faster Region Based Convolutional Neural Networks (R-CNN), solid state device (SSD), Retinanet, and YOLO. Among the existing object detection choices YOLO is the promising one that requires comparatively low computational power but still achieves acceptable standard of accuracy and it's refreshingly simple to train and test.

'YOLO', which stands for 'You Only Look Once', is a deep learning-based object detection algorithm developed by Joseph Redmon and Ali Farhadi at the University of Washington in 2016. The rationale behind calling the system YOLO is that rather than pass in multiple sub images of potential objects, one only pass in the whole image to the deep learning system once. Then, you would get all the bounding boxes as well as the object category classifications in one go. This is the fundamental design decision of YOLO and is what makes it a refreshing new perspective on the task of object detection. Also, Yolo V4 which is available in public domain developed by Alexey Bochkovskiy, Chien-Yao Wang, Hong-Yuan Mark Liao is the current state of the art model for object recognition.

The object detection technology is particularly helpful for companies managing roadways and assets on the roadways to keep track of all the assets. This particularly is a tedious task as there are thousands of assets along the roadways. The assets could include fixed use-cases such as Streetlights, Signboards, Kilometre stones, Delineators, etc; Linear use-cases such as MBCB, Kerbs, etc; and other use-cases such as Potholes, Cracks, etc. Thus, it requires huge manual intervention and effort to keep a track of the asset conditions and at times it is practically impossible to manually keep track of all these assets. In the background of foregoing description, thus, there is a need for a system that detects, tracks and monitors the condition of the assets present in the given site, with very minimal hardware requirements.

OBJECT OF THE INVENTION

The primary objective of the present disclosure is to provide identifying and analyzing any assets on the roads, streets, pathways, highways (hereinafter collectively referred as roadways).

In one other objective of the present disclosure, GPU based embedded computer vision technology for assets management for roadways which detects, tracks and monitors the assets, is provided.

Another objective of the present disclosure is to provide an economic and cost-effective, system for detecting, tracking and monitoring the condition of the assets present in the given site, with very minimal hardware requirements.

Another objective of this disclosure is to develop a quality, automated and unique system capable of detecting objects and assigning trackers to each object and mapping it to detections to its corresponding geo-coordinates.

Another objective of this disclosure is to provide a system capable of requiring just one detection and its location to create a tracker accurately.

In yet another objective of the present disclosure, the system is capable of identifying the geo-coordinates and showing the image along with details.

In still another objective of the present disclosure, the system is capable of detecting missing and damaged assets/use cases along the roadway.

SUMMARY OF THE INVENTION

An embodiment consistent with the claimed inventions is directed to system for identifying and analyzing roadway assets, comprising a video capturing unit configured to record a video; a comparison unit configured to detect fixed assets by comparing data from a master video with the video recorded by the video capturing unit; an identification unit configured to identify random assets in the captured video; and a GPS unit configured to provide location co-ordinates for the fixed assets and the random assets, such that the system uses this information to identify and track the assets.

These and other aspects, features and advantages of the present invention will be described or become apparent from the following detailed description of preferred embodiments.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE EMBODIMENTS

Before the present system and method for identifying and analyzing any assets on the roads, streets, pathways, highways is described, it is to be understood that this disclosure is not limited to the particular system and method for achieving so, as described, since it may vary within the specification indicated. Throughout the specification, the terms roads, streets, highways may be collectively used as roadways or referred individually, and can be generically used to refer to a system and method for asset management for roadways which detects, tracks and monitors the assets.

It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

In accordance with one general embodiment of present disclosure, a system for detecting objects and assigning trackers to each object and mapping it to detections to its corresponding Geo-Coordinates, is disclosed. Based on the number of detections, it assigns new trackers and counts the objects identified using optimal and efficient computation. The present system requires just one detection and its location to create a tracker accurately. Also if an object is missing in any given location, the system identifies the geo-coordinates and shows the image along with its details. Particularly, in one significant embodiment, a GPU based embedded computer vision technology for asset management for roadways which detects, tracks and monitors the assets, is disclosed.

Figure 1:
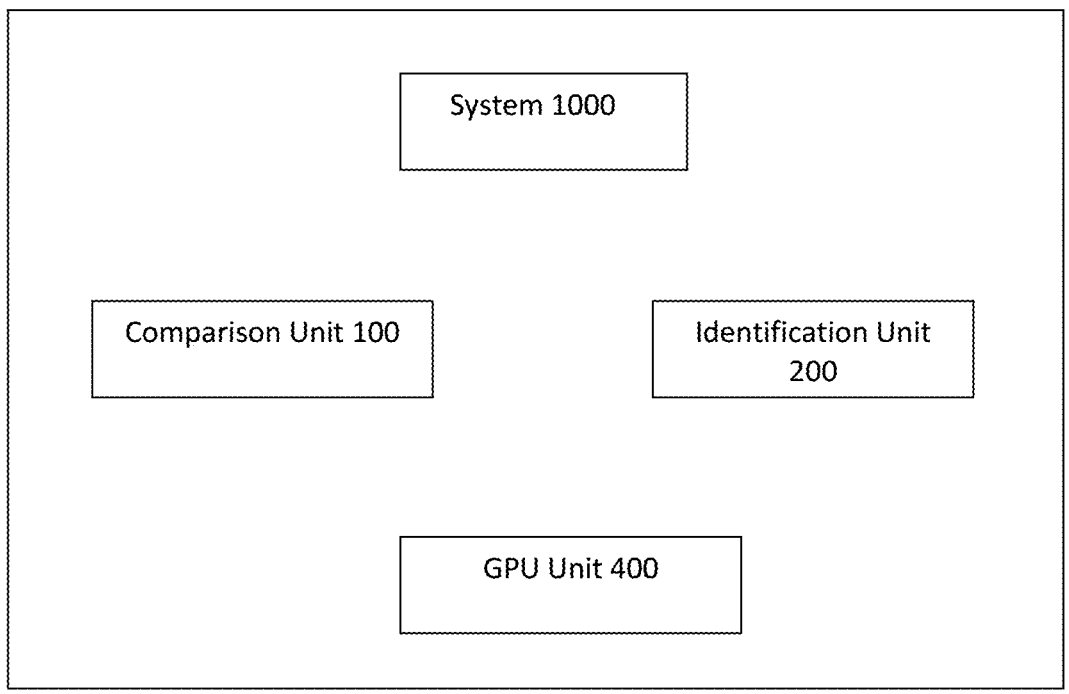
FIG. 1 illustrates a block diagram of a system, in accordance with one exemplary embodiment of present disclosure.

In one example embodiment, the list of assets include:
1. Kilometer Stone
2. Delineator
3. Thermoplastic Paint
4. Kerb
5. Metal beam crash barrier
6. All variations of High Mast Light
7. All variations of Solar Blinker
8. Hazard Board
9. Hectometer Stone
10. All variations of Signboards
11. Gantry Board
12. VMS Gantry
13. All variations of Guard Rails
14. All variations of Street Lights
15. All variations of Streetlight DB Box
16. All variations of ATCC RO Panel
17. All variations of Emergency Call Box (SOS)
18. All variations of Litter Bins along the project
19. Crash Barriers
20. Expansion joints
21. New Jersey barrier
22. Median Plantation
23. All types of Encroachment (Unauthorized Occupants)
24. Potholes
25. Cracks
26. All variations of Mud Accumulation
    a. Normal Sand
    b. Red Sand
    c. Cement
27. Water Stagnation
28. Drainage
    a. Lined drain
    b. Divider drain
29. Over speeding of Route Patrol Vehicle
30. Wall Posters
31. Shop Boards/Hoardings
32. Vegetation growth on structures
33. All variations of CCTV Camera
34. Night Video: Working Status of Street Light
35. Night Video: Working Status of Solar Blinker
36. Night Video: Working Status of VMS Referring now to FIG. 1, a GPU embedded system and method for detecting missing and damaged assets/use cases along the roadway. These assets include streetlights, signboards, kilometer stones, delineators, cracks, potholes, etc. In one particular embodiment, the system 1000 comprises of a comparison unit 100 and an identification unit 200 for identifying and tracking the assets of the roadway. Here, the comparison unit 100 is configured to compare with a master video that the user has uploaded. Data extracted from the master video is used to compare with every day shift/patrol videos. The comparison unit 100 works best for managing fixed assets such as Signboards, Kilometer stones, etc.

In one other embodiment, the identification unit 200 does not require the master video. Thus, the identification unit 200 works best for linear/random assets/use cases such as potholes, cracks, missing MBCB, damaged kerbs etc. In one specific embodiment, a system also works with night videos. This can be used to know the working status of assets such as street lights, solar blinkers and reflective assets such as hazard markers, caution boards etc.

Further, system 1000 includes a video capturing unit 300 to record the daily patrolling videos. In an aspect when a user uploads a master video, the comparison unit 100 compares the data extracted from the master video to get information on fixed assets such as Signboards, Kilometre stones, etc. on the roadway with every day shift/patrol videos of the video capturing unit 300. In another aspect the present invention includes GPS unit 400 which can be any positioning system known to the person skilled in the art. The GPS unit 400 associates the fixed assets detected by the comparison unit 100 and the random assets identified by the identification unit 200 with location co-ordinates. Thus, the system 100 of the present invention is used for monitoring the assets on the roadways.

In accordance with one preferred embodiment, the present invention provides a combination of YOLOACT and YoloV4 algorithms that are customized to run on GPU as a multi-threaded process to detect assets on the roadways. The present invention includes modules such as Tracking Module 450, Mapping module 500, Localizing module 600, etc. in addition to the YoloV4 model. The present invention also combines other proven segmentation models such as YOLACT to create a unique solution which addresses a wider range of use cases. The system 1000 of the present invention is customized such that the entire framework works specifically for roadways.

Figure 4:
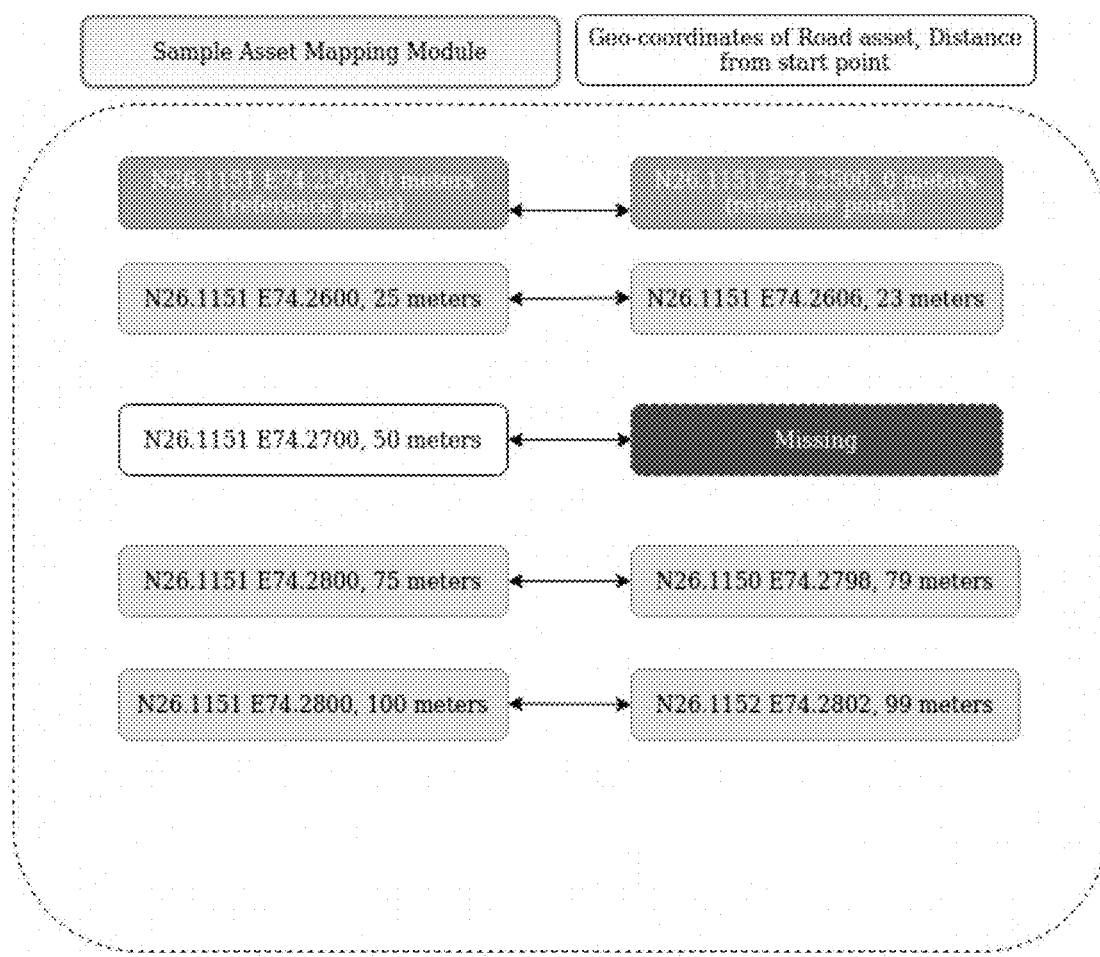
FIG. 4 illustrates functionality aspect of mapping module, in accordance with one exemplary embodiment of present disclosure.

Following from above, the tracking module 450 and mapping module 500 (shown in FIG. 4) is discussed in one working aspect of present disclosure. As GPS data is not consistent to the same location every day, the coordinates assigned to an asset differs in every video recorded. With GPS coordinates varying for the same location, the mapping module 500 is configured to accurately map the asset. Keeping a reference point in the master data, the distance between the reference point and the identified asset is assessed in every video. By comparing the distance value and the asset details identified in a location, the asset is cross-mapped to its original database coordinates. This data further validates if the asset is missing in the current video.

Next, the localizing module 600 is discussed in sufficient detail. Every road network has chainage blocks for easy referencing the location and their assets. The starting and ending coordinates of every chainage is required to map the assets belonging in its region. The process of identifying the required starting and ending chainage coordinates is now automated. This is achieved by generating Distance Matrix API from google maps and comparing it with the GPS coordinates generated from the Master Video to identify the boundary coordinates for every chainage and divide the road into respective chainage blocks. Though original database coordinates are mapped to the missing assets, users will not be able to readily identify or locate its location. With this localizing module 600 one can accurately map every identified or missing asset to its respective chainage blocks, thereby making the assets easier to locate.

In one example embodiment, more than 35 use cases are to be identified and classified. However, out of them, most cases have a lot of similarity. Default YOLO model assigns equal priority to every class, but roadway assets are of various sizes and shapes. Thus, the loss functions are modified according to the dataset and tweaked anchor boxes to get more than 95% accurate results (based on trials). The hyper parameters are then finalized after several design of experiments.

Having a lot of trackers also takes a hit on the processing time. Any conventional tracker requires at least 3 frames to assign a tracker and track its path. Any occlusion which is very common on roadways, leads to multiple counts which will affect the whole solution. But in the present disclosure of tracking roadway assets, various occlusions are anticipated and possibilities of an asset being seen could even be just one frame. The present invention develops a tracking algorithm which not only works on a single frame but also hits the right balance of performance and processing time. Conventional trackers use multiple frames to assign a tracker to an asset. They also use IOU of bounding boxes to triangulate the asset and identify the speed and direction of the asset movement. It assigns a new tracker if the asset is missed over multiple frames.

Accordingly, the video is divided into left and right side as there will not be any assets in the middle of the road. The tracker of present disclosure works on the logic where an asset present in the left side always moves in the left direction and vice versa. Instead of using IOU of bounding boxes, the centre point of bounding boxes is used and the difference in pixel movements is compared to triangulate an asset. Further, the speed data from the GPS metadata is extracted to anticipate the trackers next location instead of calculating the speed of trackers. This way the present system doesn't require multiple frames to identify speed and direction of a tracker as opposed to the conventional trackers.

The present invention consumes considerably less computational power than the existing available tracker algorithms. Also, as a lot of assets are located nearby and assets looking similar, it is difficult to use existing trackers like Kalman filter or IOU for tracking the objects.

In one exemplary embodiment of present disclosure, as the solution requires to map assets to its location, the present invention uses geo coordinates and speed from the dash camera on the video to locate and mark assets location. On the whole, the present invention runs multiple processes simultaneously using a multithreading approach, for identifying & classifying objects (GPU process), for tracking the objects (for counting), etc.

Figure 2:
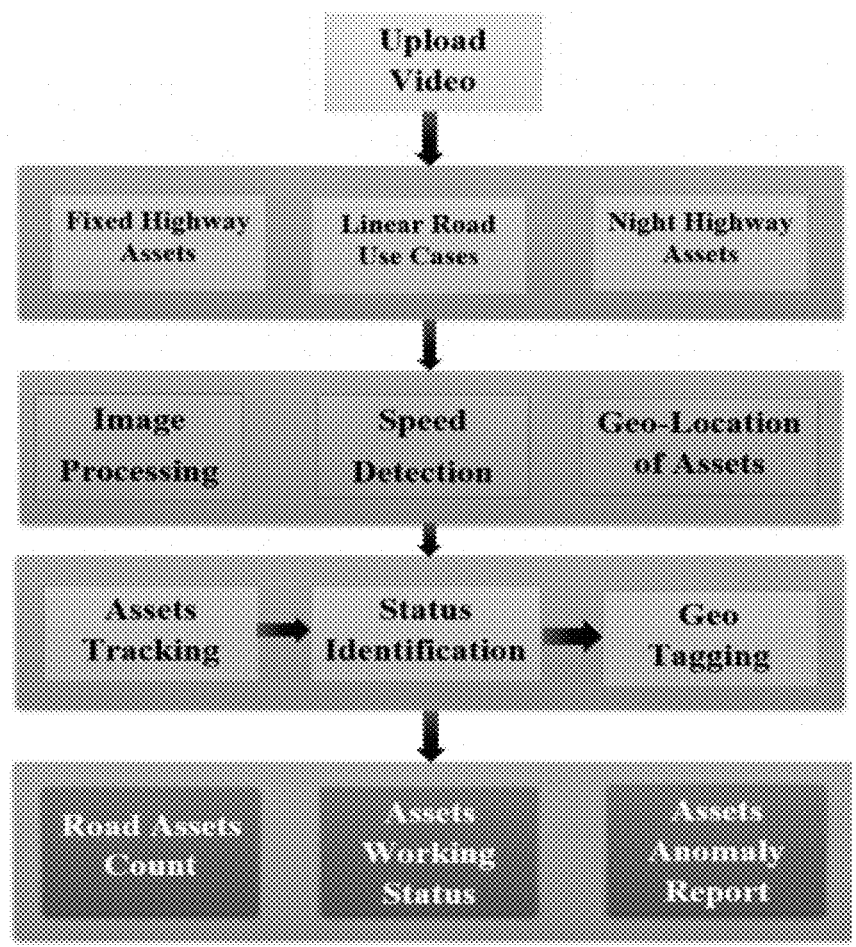
FIG. 2 illustrates a block diagram of comparison unit of the system, in accordance with one exemplary embodiment of present disclosure.

FIG. 2 illustrates a brief overview of the system and its various modules, in accordance with one preferred embodiment. Further, as will be discussed in FIG. 3, the system follows the below steps to identify, track and detect the missing objects. Detections from the YoloV4 model is handed over to the custom developed Tracker module 500. The GPS and Speed data of the vehicle is collected. In general, trackers will determine over consecutive frames, the speed and direction of the object and assign a tracker to it. But in present disclosure, the system collects frames from roadways where receiving consecutive frames with detections is not always possible. This could be due to many factors such as vehicle occlusions, lighting conditions, smaller objects, etc. By using traditional trackers, this will not be possible as it would assign multiple trackers to the same object.

The present system 1000 detects a pattern that all the objects detected on the right side will always move along the right side in the next consecutive frames. The same pattern can be identified for the objects detected on the left side. Based on this pattern the tracker module 500 is configured to estimate the direction of the object's movements. For accurate tracking of objects, any module requires both the speed and direction of the objects.

Figure 3:
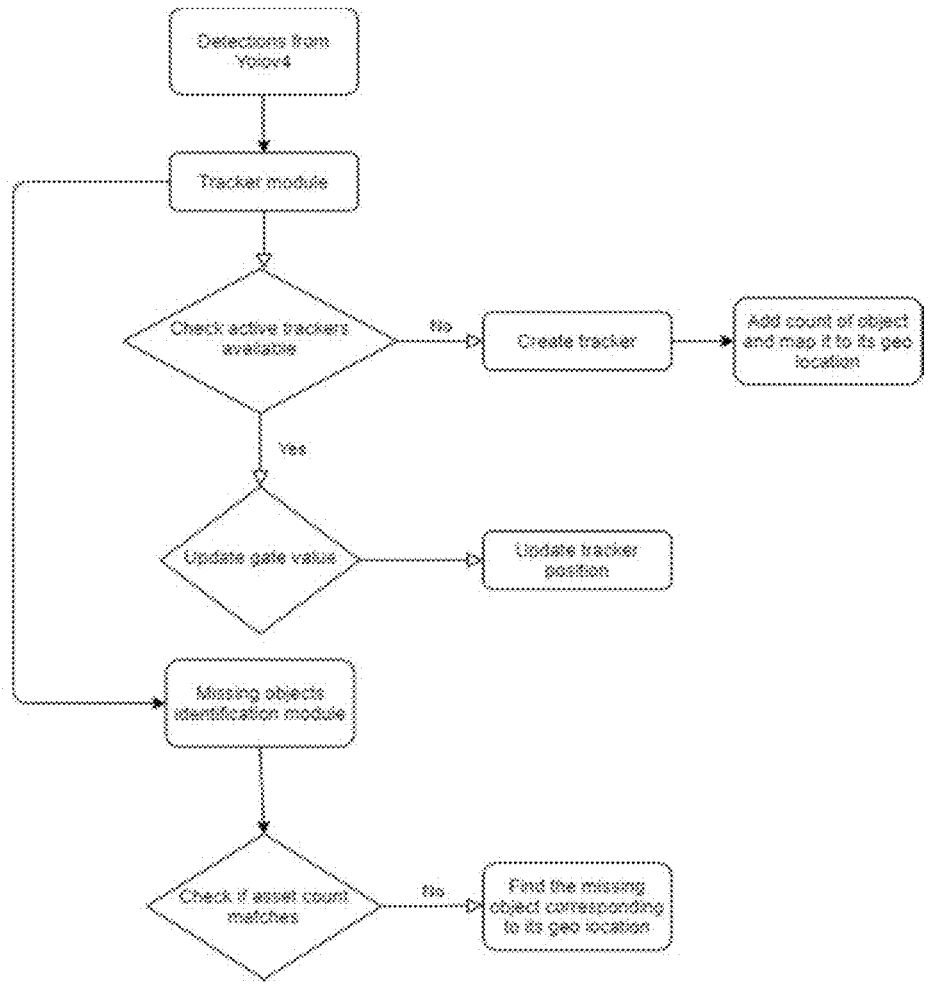
FIG. 3 illustrates a flow chart of the custom developed tracker module to suit the system, in accordance with one exemplary embodiment of present disclosure.

The presently developed tracker innovatively combines the above mentioned data of the vehicle speed and object coordinates ie. object on the left side or the right side of the roadways to predict the objects next location in the consecutive frames. This method significantly decreases the computation power and also reduces false counts considerably. As illustrated in FIG. 3, the system 100 assigns trackers to the detected objects. If there are no active trackers, the system 100 will assign a tracker to the specific detected object. If the object is detected for the first time, its geo-coordinates and the asset count is saved to the database. In the next consecutive frames, if the same object is detected within a pixel distance threshold, the system 1000 does not assign a new tracker; instead updates the active tracker's current position. During post processing, the system 1000 tallies the object detections in the given stretch. If the numbers don't match with the database, the 'Missing Object' module 700 will calculate and locate the Objects missing in the stretch.

The foregoing description is a specific embodiment of the present disclosure. It should be appreciated that this embodiment is described for purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

I claim:

1. A system for identifying and analyzing roadway assets on a roadway, comprising:
    a video capturing unit configured to record a video while patrolling on the roadway;
    a comparison unit configured to detect fixed assets by comparing data from a master video with the video recorded by the video capturing unit;
    an identification unit configured to identify random assets in the video recorded by the video capturing unit;
    a global positioning system (GPS) unit configured to provide location coordinates for the fixed assets and the random assets, such that the system uses this information to identify and track the fixed assets; and
    a tracker module configured to receive: coordinates of the fixed asset in a frame; a relative position of the fixed asset, wherein the relative position being relative to the center of the frame; and a speed of the video capturing unit at the time of recording the video, and predict coordinates of the fixed asset in a consecutive frame of the video based on the speed of the video capturing unit, the relative position of the fixed asset and coordinates of the fixed assets in the frame.

2. The system as claimed in claim 1, wherein master video is obtained from one or more users.

3. The system as claimed in claim 1, wherein the comparison unit extracts data from the master video.

4. The system as claimed in claim 1, wherein the GPS unit can be based on satellite-based system for determining geo-coordinates.

5. The system as claimed in claim 1, wherein the system monitors the roadways assets by detecting the fixed assets and identifying the random assets.

6. The system as claimed in claim 1, wherein the tracker module is configured to generate a count which identifies missing objects and its location based on the count.

7. The system as claimed in claim 1, further comprises a mapping module configured to compute distance between a reference point in the master video and the identified assets captured in the video, and cross map the identified asset to original database coordinates.

8. The system as claimed in claim 1, further comprises a localizing module configured to map the identified assets to corresponding chainage blocks for accurate location identification.

9. A method for identifying and analyzing roadway assets on a roadway, comprising:
   using a video capturing unit, recording a video while patrolling on the roadway;
   using a comparison unit, detecting fixed assets by comparing data from a master video with the video recorded by the video capturing unit;
   using an identification unit, identifying random assets in the video recorded by the video capturing unit;
   using a global positioning system (GPS) unit, providing location coordinates for the fixed assets and the random assets, such that the system uses this information to identify and track the fixed assets;
   using a tracker module receiving coordinates of the fixed asset in a frame, a relative position of the fixed asset and a speed of the video capturing unit at the time of recording the video, wherein the relative position being relative to the center of the frame; and
   using the tracker module, predicting coordinates of the fixed asset in a consecutive frame of the video based on the speed of the video capturing unit, the relative position of the fixed asset and coordinates of the fixed assets in the frame.

10. The method as claimed in claim 9, wherein master video is obtained from one or more users.

11. The method as claimed in claim 9, wherein the comparison unit extracts data from the master video.

12. The method as claimed in claim 9, wherein the GPS unit is be based on satellite-based system for determining geo-coordinates.

13. The method as claimed in claim 9, and further comprising monitoring the roadway assets by detecting the fixed assets and identifying the random assets.

14. The method as claimed in claim 9, wherein using the tracker module to generate a count that identifies missing objects and a location of the identified missing object based on the count.

15. The method as claimed in claim 9, and further comprising using a mapping module to compute distance between a reference point in the master video and the identified assets captured in the video, and to cross map the identified asset to original database coordinates.

16. The method as claimed in claim 9, and further comprising using a localizing module to map the identified assets to corresponding chainage blocks for accurate location identification.

* * * * *